LINE TIE

Filed May 17, 1965 4 Sheets-Sheet 1

INVENTOR.
Robert A. Eucker,
BY
Hume, Groen, Clement + Hume.
attys.

Nov. 15, 1966 R. A. EUCKER 3,286,023

LINE TIE

Filed May 17, 1965 4 Sheets-Sheet 2

INVENTOR.
Robert A. Eucker,
BY
Hume, Groen, Clement & Hume
Attys

Nov. 15, 1966 R. A. EUCKER 3,286,023

LINE TIE

Filed May 17, 1965

4 Sheets-Sheet 3

INVENTOR.
Robert A. Eucker,
BY
Hume, Groen, Clement & Hume
Attys.

Nov. 15, 1966

R. A. EUCKER 3,286,023

LINE TIE

Filed May 17, 1965

4 Sheets-Sheet 4

INVENTOR.
Robert A. Eucker,
BY
Hume, Groen, Clement & Hume
Attys

United States Patent Office 3,286,023
Patented Nov. 15, 1966

3,286,023

LINE TIE

Robert A. Eucker, Brooklyn, Ohio, assignor to Preformed Line Products Company, Cleveland, Ohio, a corporation of Ohio Filed May 17, 1965, Ser. No. 456,390
7 Claims. (Cl. 174—173)

This invention pertains to appliances to be used in connection with linear bodies such as electrical conductors, cables, stranded ropes, and the like, and in particular relates to means for securing such linear bodies to suspension devices.

The manner in which electrical conductors and other types of linear bodies are secured to suspension devices is of considerable importance. One approach is to lash the conductor to the support device with wire. This approach, however, has several disadvantages which render it unsuitable. For example, it is generally desirable that the conductor be gripped relatively tightly so as to secure it against axial displacement. It is well known that with wire lashing an adequate gripping arrangement is extremely difficult to achieve and even more difficult to maintain unless auxiliary clamping devices are used. Moreover, in order that it may be easily wrapped around the conductor and the suspension device, wire is used which has little or no natural resiliency. As a result, vibrations of the conductor distort the lashing wire and tend to cause it to loosen at the ends until it no longer grips the conductor in the desired manner. Consequently, it is necessary to secure or anchor the ends of the lashing wire by some auxiliary device.

Another approach utilizes clamps for securing the conductor to the suspension member. While clamps do meet the problem of gripping, they have at least one disadvantage which limits their practicality. Specifically, most clamps, particularly in the gripping members or jaws, are relatively rigid and consequently prevent flexing of the conductor within the gripping portions. Since electrical conductors are generally in a state of constant vibration as a result of wind and other climatic forces to which they are subjected, there is a sharp line of demarcation between the free portion of the conductor which is being flexed or vibrated and that which is not flexed due to the restraint imposed by the gripping members of the clamping device. This line of demarcation results in an area or point of stress concentration which leads to fatigue failure of the conductor.

A further consideration is the facility with which the securing device may be assembled and disassembled on the conductor or linear body. In most instances, the assembly and disassembly takes place in an elevated position, such as the top of a tower or on a cross arm from which the conductor is suspended. Hence, the lineman is likely to be working in a limited space while maintaining a rather precarious position of balance. Consequently, it is desirable that the device be adapted to assembly and disassembly with relative ease and facility.

For the foregoing reasons, it has been found desirable that a device for securing an electrical conductor or other linear body to a support member be provided which has gripping qualities of a clamp but which eliminates the stress concentration inherent in a clamp. It is also desirable that the device be further characterized by relative ease of assembly and disassembly. A securing device satisfying these requirements is disclosed in United States Letters Patent No. 3,042,745, issued to Harrison L. Williams. However, the Williams device is pirmarily adapted to securing a linear body in the saddle portion or groove provided in the end of a support member or insulator. In same circumstances, it is particularly desirable to secure the linear body or electrical conductor to the side of the support member or insulator. For example, where the insulator is mounted in an inverted position on the underside of a supporting arm, it is desirable that the conductor be secured to the side of the insulator in order to insure a satisfactory support condition. Accordingly, it is the primary object of the present invention to provide an appliance for securing linear bodies, such as electrical conductors, cables, stranded ropes and the like to the side of a support member or suspension means.

A further object of the invention resides in the provision of a device for securing linear bodies to the side of suspension devices in a manner which minimizes stress concentration and which permits a tightly gripping relationship with the linear body without the use of auxiliary means.

A still further object of the invention resides in the provision of the device for securing linear bodies to the side of suspension devices such as electrical insulators which facilitates ease of assembly and disassembly with the linear body and suspension device without the necessity of special tools or skills.

A specific object of the present invention is to provide an appliance for securing linear bodies to the side of a suspension device which includes at least one linear element having a portion preshaped in substantially the configuration of a bight with its legs return bent about a line substantially normal to its axis of symmetry.

These and other objects of the invention will be apparent upon reading of the specification with reference to the following drawings. In the drawings.

Figure 3:
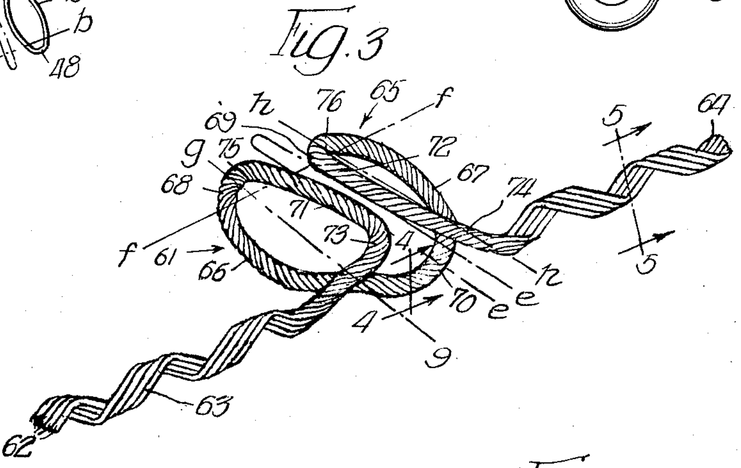
FIGURE 3 is a perspective view of a further preferred form of the appliance embodying the invention.
Figure 18:
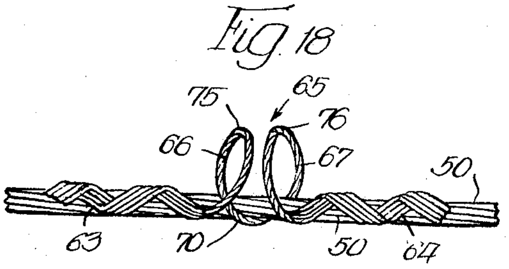
Figure 19:
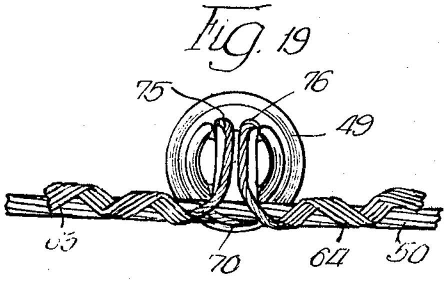
Figure 20:
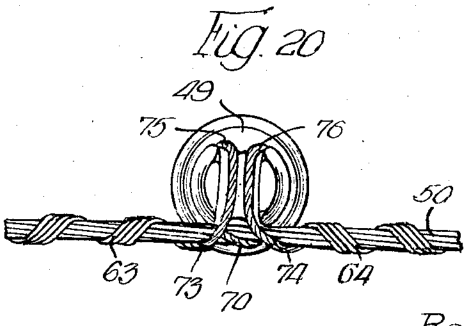
Figure 14:
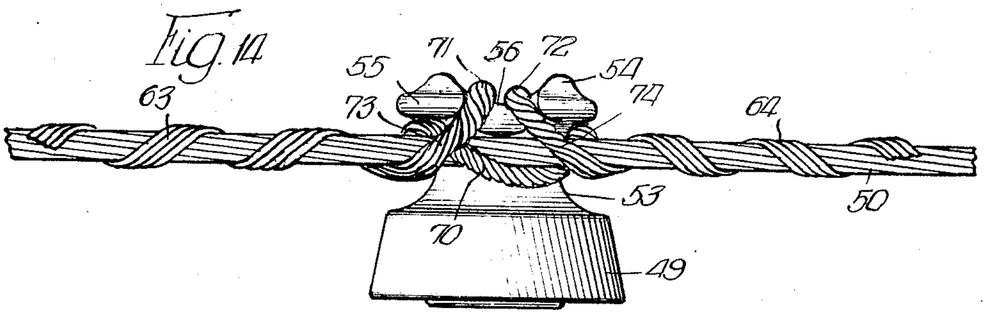
FIGURE 14 is a front view in elevation of the appliance shown in FIGURE 3 assembled to an electrical conductor and a pin-type insulator.
Figure 15:
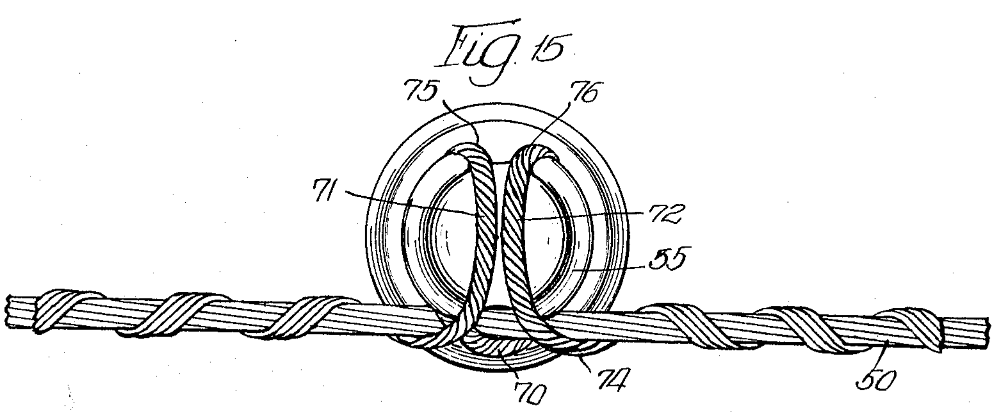
FIGURE 15 is a top plan view of the assembly shown in FIGURE 14.
Figure 16:
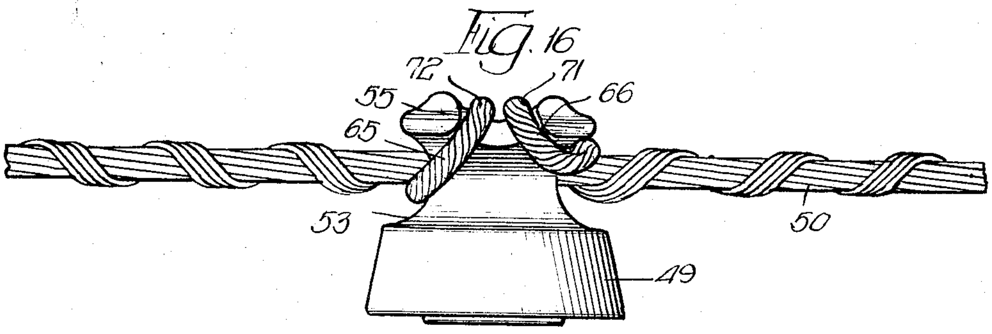
FIGURE 16 is a rear view in elevation of the disassembly in FIGURE 14.
Figure 17:
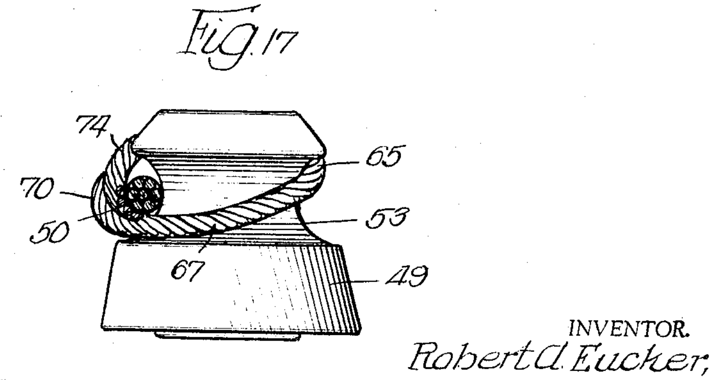
FIGURE 17 is a side view in elevation of the assembly shown in FIGURE 14.

FIGURES 18, 19, and 20 illustrate a preferred method for assembling the appliance shown in FIGURE 3 to the electrical conductor and insulator.

Although this specification will, for the most part, refer only to electrical conductors, it is to be understood that this is merely by way of example without limitation and that the invention is applicable to linear bodies in general.

Figure 1A:
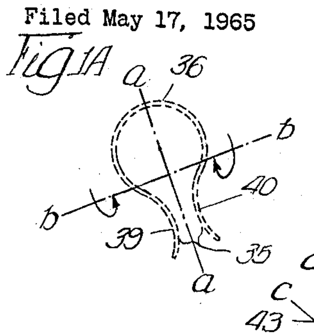
FIGURES 1A through 1D are views relating to the intermediate portion of the appliance of FIGURE 1 to aid in understanding the invention.
Figure 1:
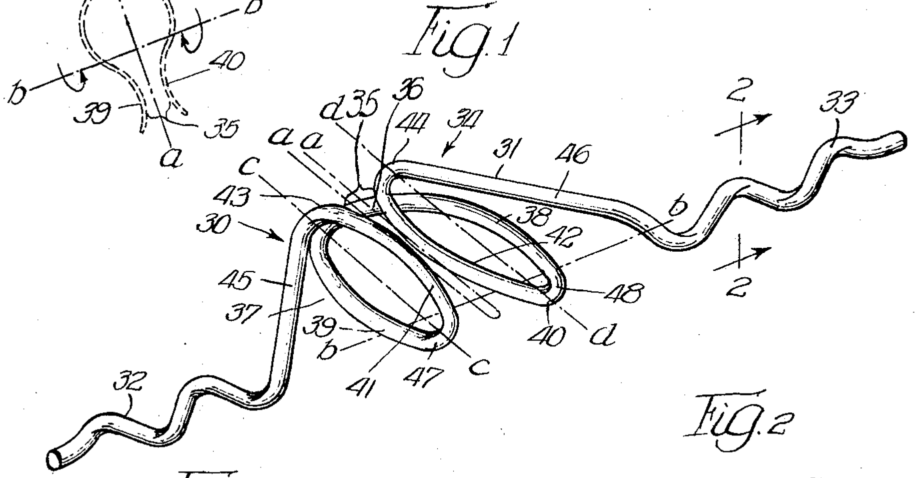
FIGURE 1 is a perspective view of one preferred form of the appliance embodying the invention.
Figure 2:
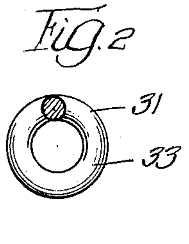
FIGURE 2 is a sectional view taken along the line 2—2 in FIGURE 1.

Referring now to FIGURE 1, there is shown a preferred form of the appliance embodying the invention generally denoted by numeral 30. In this instance, the appliance 30 is constructed of a single linear element 31 which has been helically preshaped for at least a portion of its length at each end. The helically-preshaped portions 32 and 33 are similar to those utilized in the construction of other appliances such as disclosed in United States Letters Patents to Thomas F. Peterson, e.g., 2,609,653 and 2,761,-273, and may be formed by any suitable method, such as that disclosed in United States Letters Patent 2,691,865, also issued to Thomas F. Peterson. The element 31 may be fabricated of any suitable material that has sufficient strength, resiliency, and flexibility to meet the requirements of this type of securing device, such as metal, plastic, or a combination of metal coated with plastic or other suitable insulating material. Although the element 31 is shown in FIGURE 2 as having a circular cross section, it is contemplated that other cross sectional configurations may be adopted.

The helically preshaped portions 32 and 33 are preferably formed to have a pitch length sufficiently long that they may be applied to an electrical conductor from the side thereof without exceeding their elastic limits. The internal diameter of the helical portions will in most instances be somewhat less than the diameter of the conductor so that the helical portions are forced to resiliently expand to accommodate the conductor. In this manner, it is possible to achieve a tightly-gripping relationship between the helices and the conductor. A cross-sectional view of the helical portion 33 is provided in FIGURE 2.

Figure 1B:
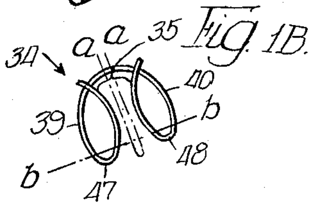

Intermediate the helically shaped portions 32 and 33, the element 31 includes a portion 34 which is in substantially the configuration of a bight with its legs return bent about a line substantially normal to its axis of symmetry. As used herein, "bight" means an untwisted loop in a linear body including an apex, a pair of legs, and a mouth. In FIGURE 1A the bight configuration of the intermediate portion 34 is depicted in a phantom view as it would appear without the legs return bent to aid in understanding the configuration of the intermediate portion 34. Thus, in FIGURE 1A it is readily seen that the bight includes an apex 36, a pair of legs 39 and 40, and a mouth 35 defined by the legs 39 and 40. In the actual configuration of the intermediate portion 34, the legs 39 and 40 are respectively return bent at bends 47 and 48 about a line *b—b* substantially normal to the axis of symmetry *a—a* of the bight, as indicated in FIGURE 1A by the arrows and as illustrated in FIGURES 1 and 1B. The line of symmetry *a—a* of the bight is, hence, substantially U-shaped.

Referring to FIGURE 1, on one side of the return bends 47 and 48 the arcuate sections 37 and 38 of the legs 39 and 40, respectively, are in substantially a circular configuration with the apex 36 and preferably define with the apex 36 a plane which is substantially parallel to the axes of the helical portions 32 and 33. On the opposite side of the return bends 47 and 48, the sections 41 and 42 of legs 39 and 40, respectively, define the mouth 35 of the bight and are preferably arched outwardly from the recited plane and mutually inclined toward one another.

Figure 1C:
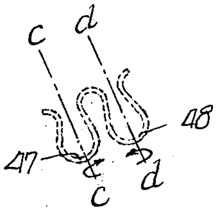
Figure 1D:
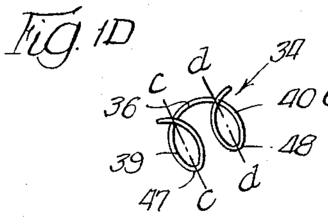
Figure 6:
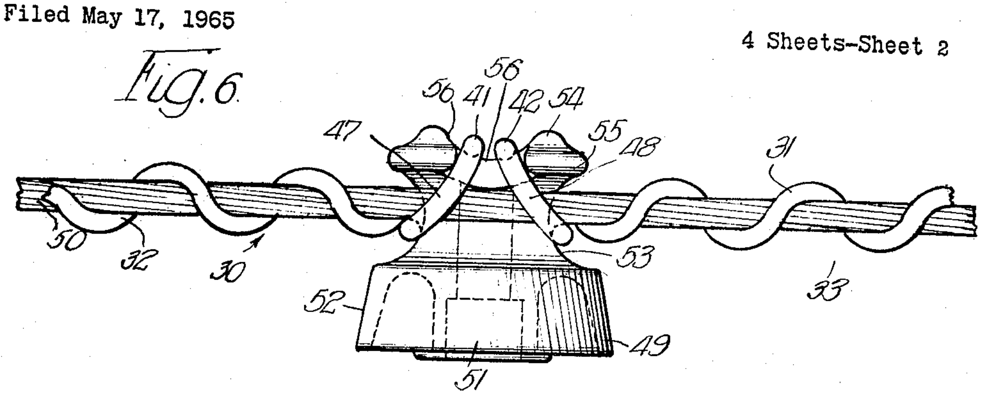
FIGURE 6 is a front view in elevation of the appliance shown in FIGURE 1 assembled to an electrical conductor and a pin-type insulator.
Figure 7:
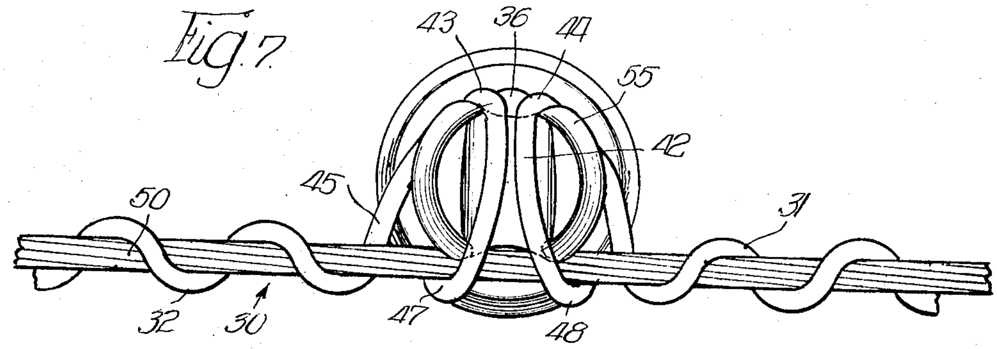
FIGURE 7 is a top view in plan of the assembly shown in FIGURE 6.
Figure 8:
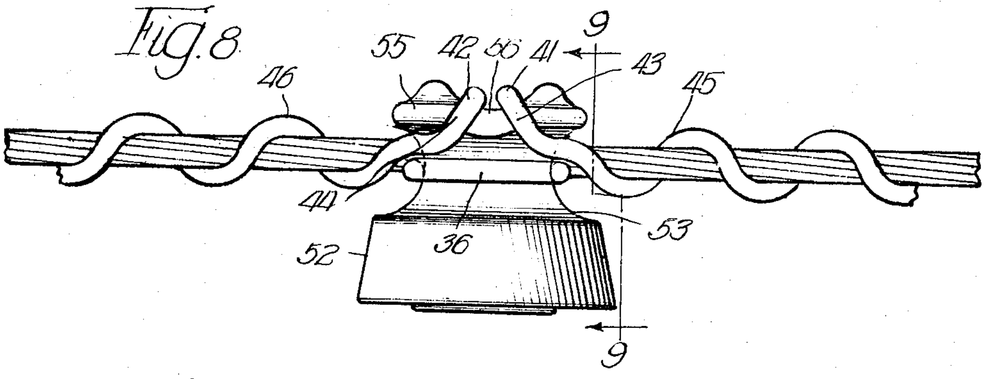
FIGURE 8 is a rear view in elevation of the assembly shown in FIGURE 6.
Figure 9:
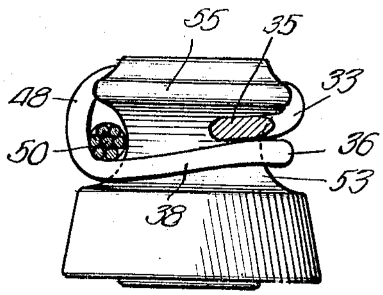
FIGURE 9 is a side cross-sectional view in elevation taken along the line 9—9 in FIGURE 8.

In passing, it is noted that the intermediate portion 34 may alternatively be described as being substantially in the configuration of a pair of spaced twisted bights extending in the same direction and the apexes of which comprise the bends 47 and 48, respectively. To aid in understanding the configuration of the intermediate portion 34, the pair of spaced bights referred to are depicted in FIGURE 1C in a phantom view as they would appear if untwisted. The respective axes of symmetry, *c—c* and *d—d*, of such bights are substantially parallel. In the actual configuration of the intermediate portion 34, each of the recited bights would be characterized as being twisted about its respective axis of symmetry, *c—c* or *d—d*, in an amount of from 90 to 180 angular degrees in an opposite rotational direction from the other, as indicated by the arrows in FIGURE 1C and as illustrated in FIGURES 1 and 1D. Although this alternative description may be helpful in understanding the configuration of the intermediate portion 34, the following discussion for purposes of clarity will proceed in terms of the single bight characterization of intermediate portion 34, as set forth in the preceding paragraphs.

At bends 43 and 44, respectively, the arched sections 41 and 42 of the legs 39 and 40, respectively, join angularly-disposed linear portions 45 and 46, respectively. The intermediate portion 34 of the element 31 is thereby radially displaced from the axis of the helical portions 32 and 33 in order that an electrical conductor or other linear body gripped by the helical portions 32 and 33 will also be engaged by the bends 47 and 48 of the intermediate portion 34.

Referring now to FIGURES 6 to 9, there is shown an appliance 30 of the type depicted in FIGURE 1 assembled to a pin-type insulator 49 and a conductor 50. The pin-type insulator 49 may be constructed of any suitable insulating material, such as glass or ceramic, and is adapted to be mounted on the cross-arm of a line pole or tower (not shown) by means of a pin (not shown) which is received in the recess 51. The insulator 49 includes a flared skirt 52 to prevent moisture accumulation. The insulator 49 further includes an annular recess 53, a head portion 54, and a collar 55. The head portion 54 is provided with a groove 56.

When the appliance 30 is assembled to the insulator 49 and the conductor 50, it is seen that the conductor 50 is disposed in the annular recess 53 where it is engaged and held against the insulator 49 by the bends 47 and 48. The sections 41 and 42 are disposed in the groove 56 of the insulator 49 while the apex 36 and the adjacent sections 37 and 38 are disposed in the annular recess 53 of the insulator 49. The sections of the linear portions 45 and 46 adjacent the bends 43 and 44, respectively, are also disposed within the annular recess 53. The collar 55 serves to prevent the electrical conductor 50 and the portions of the element 31 disposed in the annular recess 53 from slipping off or working off the insulator. The appliance 30 is preferably constructed so that the respective repose distances between the bend 47 and the bend 43 and between the bend 48 and the bend 44 are less than that required to span the respective distances between these same points when the appliance 30 is assembled to the insulator 49 and the electrical conductor 50. In this manner, the sections 37, 38, 41 and 42 are flexed against their natural resilience when the appliance 30 is assembled to the insulator 49 and conductor 50 so that the bends 47 and 48 are forced against the conductor 50, binding the conductor 50 tightly into the annular recess 53. As a result of this binding by the intermediate portion 34, the conductor 50 is restrained against any movement that would tend to dislodge it from the annular recess 53 and is securely supported whether the insulator 49 is disposed in an upright, inverted, or horizontal position. It will be apparent that preferably the sections 37, 38, 41 and 42 should not have to flex an amount in excess of their elastic limit. This factor would be an important consideration in the construction and dimensions of an appliance to be used in specific installations. It should be noted in reference to this embodiment that the cable gripping helical portions 32 and 33 not only prevent axial movement of the conductor 50 but that they also help lock the center portions of the conductor 50 to the insulator 49. When the helical portions 32 and 33 are forced into encircling relationship with the conductor 50, they exert a scissors-like grip upon the insulator 49 whereby the appliance is forced into tighter engagement with the insulator 49 and the conductor 50.

As indicated, the helical end portions 32 and 33 of the appliance 30 extend along the conductor 50 in an encircling relationship therewith. In this instance they are shown in gripping engagement with the conductor 50 so that there is substantially no axial play of the conductor relative to the insulator 49. It will be noted in this embodiment that the hands-of-lay of the helically preformed portions 32 and 33 are opposite, although in some instance it may be desirable that they be the same.

Figure 10:
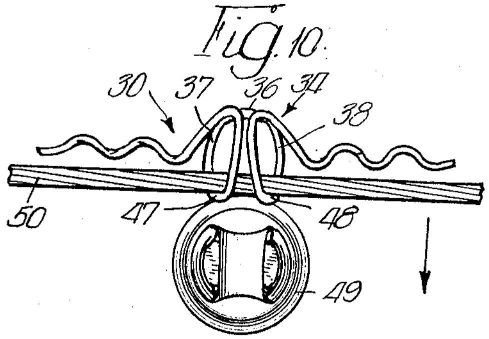
FIGURES 10, 11, 12 and 13 illustrate a preferred method for assembling the appliance shown in FIGURE 1 to the electrical conductor and insulator.
Figure 11:
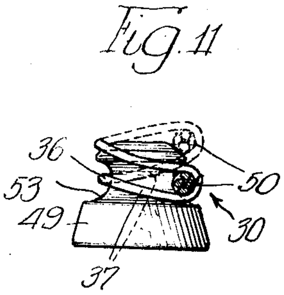
Figure 12:
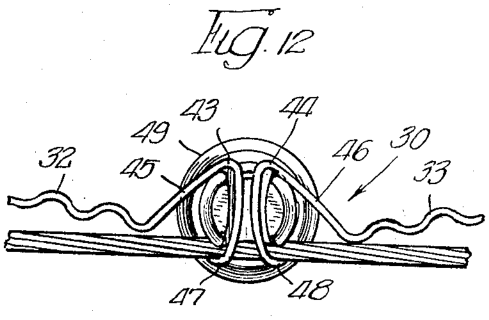
Figure 13:
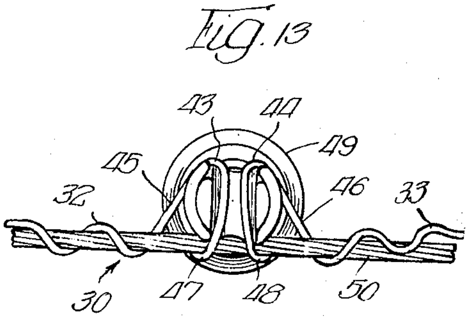

Referring to FIGURES 10, 11, 12 and 13 there is illustrated a preferred method of applying the appliance 30 to the insulator 49 and the conductor 50. The first step in this method consists in fitting the intermediate portion 34 of the appliance 30 over the conductor 50 so that the conductor 50 is engaged by the bends 47 and 48 as shown in FIGURE 10. The appliance 30 and conductor 50 are then moved over the insulator 49 in the direction of the arrow in FIGURE 10 until the apex 36 and adjacent sections 37 and 38 are disposed in the annular recess 53 in the manner shown in the phantom view in FIGURE 11. The conductor 50 is then urged downwardly until it snaps over the collar 55 and into position in the recess 53, as shown in FIGURES 11 and 12. Next the sections of linear portions 45 and 46 adjacent bends 43 and 44, respectively, are urged downwardly until they also snap into position under the collar 55 as shown in FIGURE 13. Finally, the helical portions 32 and 33 are wrapped about the conductor 50, as illustrated in FIGURE 13. Disassembly of the appliance is accomplished by reversing this procedure.

Referring now to FIGURE 3 there is shown another preferred form of the appliance embodying the invention and generally denoted by the numeral 61. In this instance, the appliance 61 is constructed of a plurality of constituent linear elements 62 which have been helically preshaped for at least a portion of their lengths. Here also, the helically preshaped portions 63 and 64 of the appliance 61 are similar to those utilized in the construction of other appliances, such as those disclosed in the United States Letters Patent Nos. 2,609,653 and 2,761,273, and may be formed by any suitable method, such as that disclosed in the United States Letters Patent No. 2,691,865. The helically preshaped constituent elements 62 may be fabricated of any suitable material having sufficient strength, resiliency, and flexibility to meet the requirements of this type of securing device. Generally, the constituent elements 62 will be made of aluminum, steel, or other metal, although molded plastics and the like may be used in certain special instances.

As in the previous embodiment, the helically preshaped portions 63 and 64 are substantially co-axial and are preferably formed to have a pitch length sufficiently long that they may be applied to an electrical conductor from the side thereof without exceeding the elastic limits. Similarly, the internal diameter of the helical portions 63 and 64 will, in most instances, be somewhat less than the external diameter of the conductor so that they are forced to resiliently expand to accommodate the latter, achieving a tightly-gripping relationship between the helices and the conductor.

Figure 5:
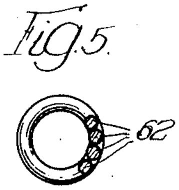
FIGURE 5 is a sectional view taken along the line 5—5 in FIGURE 3.

The appliance 61 in the embodiment of FIGURE 3, is constructed of four constituent elements 62 which are mutually conforming and arranged in a bridging relationship throughout the helical portions 63 and 64 so as to form helical bands. A cross-section of the helical portion 63 is shown in FIGURE 5. It may be desirable in some instances that the elements 62 be secured in their bridging relationship by means of an adhesive, solder, brasing compound, or the like.

Figure 4:
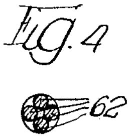
FIGURE 4 is a sectional view taken along the line 4—4 in FIGURE 3.
Figure 3A:
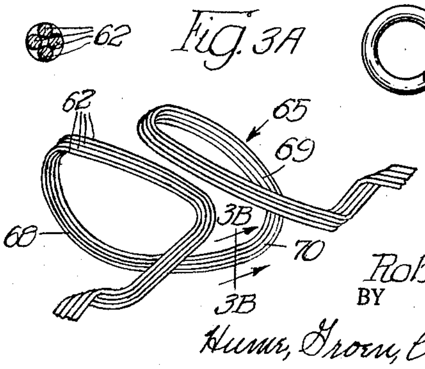
FIGURE 3A is a perspective view of a modified intermediate portion for the appliance of FIGURE 3.
Figure 3B:
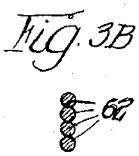
FIGURE 3B is a cross sectional view taken along line 3B—3B of FIGURE 3A.

Intermediate the helically preshaped portions 63 and 64, the reinforcement elements 62 have been formed into a closed helix which comprises the intermediate portion 65. The closed helix shown in cross section in FIGURE 4, may be formed, for example, by assembling four of the constituent elements 62 into the desired banded relationship and then intertwisting them at their central portions. It should be understood that a helical or intertwisted form is not a necessary condition of the intermediate portion 65. The elements 62, for example, may be in banded but non-helical and non-intertwisted relationship throughout the intermediate portion 65, as shown in FIGURES 3A and 3B.

As shown in FIGURE 3 the intermediate portion 65, like the intermediate portion 34 of the FIGURE 1 embodiment, is also preshaped in substantially the configuration of a bight with its legs 68 and 69 return bent at bends 75 and 76 about a line *f—f* normal to its U-shaped axis of symmetry *e—e*. On one side of the return bends 75 and 76, the arcuate sections 66 and 67 of the legs 68 and 69, respectively, preferably define for at least a portion of their lengths a plane which is substantially parallel to the axes of the helical portions 63 and 64. On the opposite side of the return bends 75 and 76, the sections 71 and 72 of the legs 68 and 69, respectively, define the mouth 77 of the bight and are preferably arched outwardly from the recited plane in a mutually inclined relationship. The apex section 70 of the bight in this embodiment is twisted a slight amount about the axis of symmetry *e—e* so as to be angularly disposed at some angle less than 90 degrees with respect to the recited plane for a purpose which will be readily apparent further on.

It may be noted at this juncture that the alternative two-bight description set forth above for the intermediate portions 34 of the FIGURE 1 embodiment is also generally applicable to the instant intermediate portion 65 but for the purposes of clarity will not be employed in the ensuing discussion of the FIGURE 3 embodiment.

The sections 71 and 72 join the helical portions 63 and 64, respectively, at bends 73 and 74, respectively. The bends 73 and 74 are preferably aligned with the apex portion 70 and the helical portions 63 and 64 so that the linear body or conductor gripped by the helical portions 63 and 64 will also be readily engaged by the bends 73 and 74 and the apex portion 70, as shown in FIGURES 14 through 17.

Referring now particularly to FIGURES 14 through 17, there is shown an appliance 61 of the type depicted in FIGURE 3 assembled to the pin-type insulator 49 and conductor 50. The conductor 50 is disposed in the annular recess 53 where it is engaged and held against the insulator 49 by the bends 73 and 74 and the apex section 70 which is angularly disposed across the conductor 50. The arched sections 71 and 72 are disposed in the groove 56 of the insulator 49 while the sections 66 and 67 are disposed in the annular recess 53. The collar 55 prevents the electrical conductor 49 and the sections 66 and 67 from slipping off or working off the insulator 49. The appliance 61 is preferably constructed so that the repose distance between the bend 73 and the bend 75 and between the bend 74 and bend 76 is less than when the appliance is assembled to the insulator 49 and the conductor 50. In this manner the sections 66, 67, 71 and 72 are flexed against their natural resilience so that the bends 73 and 74, as well as the apex section 70, are forced tightly against the conductor 50 binding the conductor 50 tightly in the annular recess 53. The conductor 50 is thereby restrained against any movement which would tend to dislodge it from the annular recess 53 and is securely supported when the insulator 49 is disposed in any position. It will be apparent that preferably the sections 66, 67, 71 and 72 should not have to flex in excess of their elastic limits. This factor again would be an important consideration in the construction dimensions of an appliance to be used in specific installations.

The end portions 63 and 64 of the appliance 61 extend along the conductor 50 in an encircling relationship therewith. In this instance also they are shown as being in gripping relationship with the conductor 50 so that there is substantially no axial play of the conductor relative to the insulator 49. Here also the hands-of-lay of the helically preshaped portions 63 and 64 are opposite; in some instances it may be desirable that they be the same.

Referring to FIGURES 18, 19 and 20, there is illustrated a preferred method of applying the appliance 61 to the insulator 49 and conductor 50 in which the first step consists of fitting the intermediate portion 65 of the appliance 61 over the conductor 50 so that the apex section 70 engages the conductor 50 in the requisite diagonal manner, as shown in FIGURE 18. Next the conductor 50 is positioned in the annular recess 53, and the sections 66 and 67 are snapped into place under the collar 55, as shown in FIGURE 19. Finally, the helical portions 63 and 64 are wrapped about the conductor 50, as shown in FIGURE 20. Disassembly is accomplished by reversing this procedure.

It may be desirable to provide the helical portions of an appliance constructed in accordance with this invention with a friction-producing material such as aluminum oxide grit so that they will more tightly grip the conductor. The grit may be secured to the internal surfaces of the helical portions by any suitable means such as adhesive, glue, or the like.

It is apparent that while the embodiment shown in FIGURE 1 is constructed of a single preshaped element 33 and the embodiment shown in FIGURE 3 is constructed of a plurality of preshaped constituent elements 62, this is by way of illustration, and either embodiment may be constructed of a single preshaped element or a plurality of preshaped elements. Further, the precise number of elements utilized may vary and the invention is not limited to any specific number. Regardless of the number of elements utilized, the helical portions of the appliance should preferably be of open pitch such that they may be readily applied to an electrical conductor without exceeding their elastic limit.

It should be noted that appliances constructed in accordance with this invention may be applied with relative ease and without special skills or tools. It may be desirable in some instances, particularly where the appliance is being applied to heavy cables and is constructed of relatively heavy reinforcement elements to utilize a simple prying instrument such as a screwdriver or the like, to aid in wrapping of the helices about the conductor and in snapping the conductor or portions of the appliance into position in the annular groove of the insulator. The application of the appliance, however, normally will not require the use of tools and may be accomplished in accordance with the simple procedures outlined with respect to FIGURES 10 through 13 and 18 through 20.

It is now apparent that the appliances described provide the further feature of vibration damping. When the conductor is vibrated, the helical portions will also tend to vibrate as a result of their natural flexibility. Their resilience at the same time will tend to resist these vibrations and consequently will act as a vibration damper. Thus, because the helical portions are flexible they will provide a damping effect with a minimum of stress concentration.

Although certain specific embodiments have been used in illustrating the invention along with specific terminology, it is to be understood that this is merely by way of example and in no manner to be construed as a limitation. It is contemplated that certain modifications may be made within the scope of the claims without departing from the spirit of the invention. It is conceivable, for example, to construct the invention with only one helical portion instead of two, or with no helical portions.

What is claimed is:

1. The combination comprising:

(a) a linear body;

(b) a support member supported at one end by external means and having a saddle-like groove at its other end extending normally to the general direction of the linear body, said support member further having an annular recess intermediate its ends; and (c) an appliance comprising at least one linear element having an intermediate portion preshaped in substantially the configuration of a bight with its legs return bent at a pair of return bends about a line substantially normal to its axis of symmetry, said bight on one side of said pair of return bends having an apex section with arcuate sections of the legs of said bight contiguous with said apex section and arranged in a substantially circular configuration with said apex section, said circular configuration embracing said support member in said annular groove, said bight on the opposite side of said return bends having sections of the legs of said bight defining the mouth of said bight, each of the latter sections being contiguous with one of said pair of return bends at one end and contiguous to another bend at the opposite end, the latter sections further being arched from said circular configuration in a mutually inclined relationship, said closely spaced sections embracing said mounting device in said saddle-like groove whereby said appliance grippingly engages said mounting device, said intermediate portion crossing over and binding said linear body in said annular recess of said support member.

2. The combination comprising:

(a) an electrical conductor;

(b) a support member which is adapted to be supported at one end by external means and having a saddle-like groove at its other end extending normal to the general direction of the conductor, said support member further having an annular recess intermediate its ends; and (c) an appliance comprising at least one linear element preshaped to include an intermediate portion substantially in the configuration of a bight with its legs return bent at a pair of return bends about a line substantially normal to its axis of symmetry, said intermediate portion engaging in said saddle-like groove and said annular recess of said mounting device and said intermediate portion crossing over said electrical conductor to bind said electrical conductor tightly in said annular recess.

3. The combination defined in claim 2 wherein said linear element further includes a pair of spaced end portions helically preshaped such that they engage said electrical conductor in an encircling relationship.

4. The combination defined in claim 2 wherein the apex section of said bight crosses over said electrical conductor to bind said electrical conductor tightly in said annular recess.

5. The combination defined in claim 2 wherein said pair of return bends of said return bent bight cross over said electrical conductor to bind said electrical conductor tightly in said annular recess.

6. The combination as defined in claim 2 wherein said appliance comprises a plurality of linear elements each preshaped to include said intermediate portion, said plurality of linear elements throughout said intermediate portions being intertwisted in the form of a stranded cable.

7. The combination as defined in claim 2 wherein said appliance comprises a plurality of linear elements in the form of a banded ribbon.

References Cited by the Examiner

UNITED STATES PATENTS

| | | | |
|---|---|---|---|
| 314,902 | 3/1885 | Winne. | |
| 872,221 | 11/1907 | Bright | 24—261 X |
| 2,263,728 | 11/1941 | Gordon et al. | 174—173 |
| 2,647,984 | 8/1953 | Falge | 24—261 X |
| 3,042,745 | 7/1962 | Williams | 174—173 |

FOREIGN PATENTS

| | | |
|---|---|---|
| 527,920 | 1/1957 | Belgium. |

LARAMIE E. ASKIN, *Primary Examiner.*